(No Model.)

T. H. STAFFORD.
LEAD PENCIL SHARPENER.

No. 378,117. Patented Feb. 21, 1888.

Witnesses
W. L. Jenks
C. E. Staniels.

Inventor
T. H. Stafford
By J. B. Thurston
Attorney.

UNITED STATES PATENT OFFICE.

THOMAS H. STAFFORD, OF CONCORD, NEW HAMPSHIRE.

LEAD-PENCIL SHARPENER.

SPECIFICATION forming part of Letters Patent No. 378,117, dated February 21, 1888.

Application filed August 22, 1887. Serial No. 247,529. (No model.)

*To all whom it may concern:*

Be it known that I, THOMAS H. STAFFORD, a citizen of the United States, residing at Concord, in the county of Merrimac and State of New Hampshire, have invented certain new and useful Improvements in Lead-Pencil Sharpeners, of which the following is a specification.

The object of this invention is to provide an implement for sharpening lead-pencils which may be carried in the pocket, and may be provided with a device for cutting cigars.

The invention consists, essentially, in providing draw-knives which take hold on opposite sides of a pencil and give a tapering cut.

Figure 1:
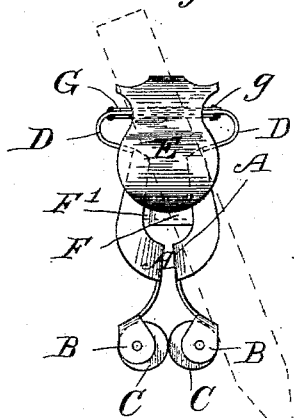
Figure 2:
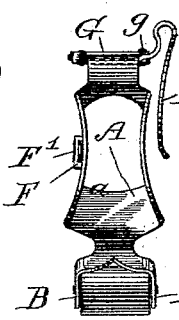
Figure 3:
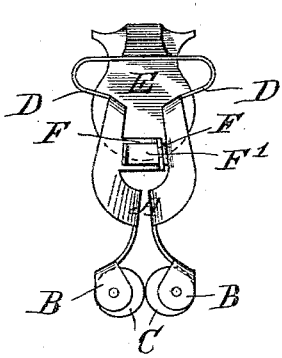
Figure 4:
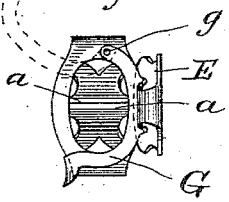
Figure 5:
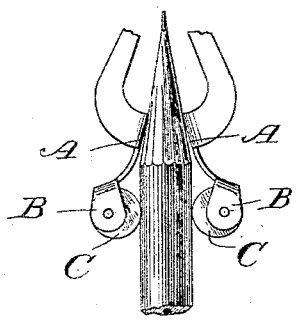
Figure 6:
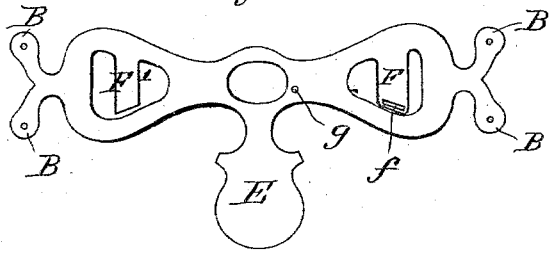

In the accompanying drawings, forming part of this specification, Figure 1 is a front elevation of the improved tool, Fig. 2 being a side view; Fig. 3, an elevation of the opposite side to that shown in Fig. 1. Fig. 4 is a general plan view. Fig. 5 represents the lower part of the implement as when in the act of cutting or sharpening a pencil. Fig. 6 represents the device as when just taken from the stamping-dies and before it has been bent into form.

Similar letters indicate like parts.

The sharpener is designed to be cut from a single piece of metal in something the form shown in Fig. 6, and then bent into the form shown in Figs. 1, 2, and 3, after which it is tempered.

The flat parts A may be sharpened at *a* to form the cutting-knives, or detachable knives may be secured thereon, if preferable. The ears B carry rolls C, which may be composed of rubber or other suitable material. These may be hung eccentrically, and adapted to spread the knives farther apart at the commencement of a cut, as shown, or they may be hung perfectly concentric with their periphery; but the former method is probably preferable.

The parts D are made sufficiently stiff to spring the cutters A *a* onto a pencil and hold them to their work without pressure by the operator.

The shield E may be inserted into the vest-pocket, or the device itself placed therein and the shield on the outside and support the same while not in use. A pencil may be carried, as represented by dotted lines in Fig. 1, while the implement remains in the pocket, if desired.

Plates F F' may be formed thereon for preventing any unnecessary lateral movement, the plate F having a slot, *f*, near its end, which may be bent, as shown in Figs. 2 and 3, to receive the plate F'.

A swivel piece or cutter, G, may be pivoted at *g* to the top of the implement by means of a hole, *g'*, and by inserting the conic end of a cigar into the place for entering a pencil and swinging said cutter G, as indicated by dotted lines in Fig. 4, the end of the cigar is readily cut.

This tool may be used for trimming or pointing sticks for various purposes; but probably the most important use it can be put to is sharpening lead-pencils.

Having described my improvement, what I claim, and desire to secure by Letters Patent, is—

1. A pencil-sharpener stamped from a single sheet of metal, formed substantially as described, comprising cutters adapted to make a tapering cut on opposite sides and lengthwise of a pencil, and a suitable pocket-hook and combining spring-rolls for properly separating said cutters, and a cigar-cutter, substantially as set forth.

2. In a pencil-sharpener, the oppositely-inclined spring-cutters adapted to make a tapering cut on opposite sides of a pencil, and suitable spring-rolls for separating said cutters as required.

3. In a pencil-sharpener, the oppositely-inclined spring-cutters adapted to make a tapering cut on opposite sides of a pencil, and suitable rolls hung eccentrically for properly separating said cutters as required.

4. A pencil-sharpener stamped from a single sheet of metal and formed substantially as described, and comprising cutters adapted to make a tapering cut on opposite sides and lengthwise of a pencil, a hook or shield for hanging the same upon a pocket, and suitable interlocking parts for preventing lateral movement during the expansion and contraction of the cutters, as set forth.

5. A pencil-sharpener stamped from a single piece of metal and formed substantially as shown, comprising cutters adapted to make a tapering cut on opposite sides and lengthwise of a pencil, and a suitable pocket-hook, and combining spring-rolls for separating said cutters, substantially for the purpose set forth.

In testimony whereof I affix my signature in presence of two witnesses.

THOMAS H. STAFFORD.

Witnesses:
J. B. THURSTON,
NATHANIEL E. MARTIN.